United States Patent Office 3,361,777
Patented Jan. 2, 1968

3,361,777
NEUTRAL CHELATES HAVING A TRANSITION METAL ATTACHED TO ONE TO THREE —SC(CF₃)=C(CF₃)S— GROUPS
Robert Bruce King, Bridgeville, Pa., assignor to E. I. du Pont de Nemours and Company, Wilmington, Del., a corporation of Delaware
No Drawing. Filed Oct. 25, 1963, Ser. No. 318,825
20 Claims. (Cl. 260—429)

ABSTRACT OF THE DISCLOSURE

This disclosure describes and claims certain 1,2-bis(trifluoromethyl)ethene- and cyclopentadienyl[1,2-bis(trifluoromethyl)ethene-1,2 - dithiolato]metal chelates, e.g., bis[1,2-bis(trifluoromethyl)ethene- and cyclopentadienyl [1,2-bis(trifluoromethyl)ethane - 1,2 - dithiolato]nickel, useful as antiknock additives for gasoline, and their preparation from metal, metal carbonyl or cyclopentadienyl metal carbonyl and bis(trifluoromethyl)-1,2-dithiete.

Field of the invention

This invention is concerned with, and has for its principal objects provision of, a new class of metal-organic compounds, the neutral mono, bis, and tris[1,2-bis(trifluoromethyl)ethene-1,2-dithiolato]metal chelates, and a synthesis of the same.

DETAILS OF THE INVENTION

The products of this invention are the [1,2-bis(trifluoromethyl)ethane-1,2-dithiolato]metal chelates and the cyclopentadienyl [1,2-bis(trifluoromethyl)ethene-1,2 - dithiolato] metal chelates. These compounds may be defined by Formula I:

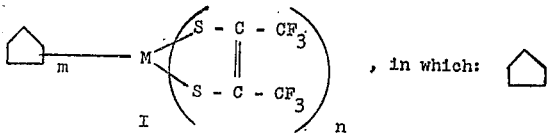

is the uncharged or neutral cyclopentadienyl radical and M is a metal from Groups I–B, IV–B, V–B, VI–B, VII–B and VIII of the Periodic Table (Deming's "General Chemistry," John Wiley & Sons, fifth edition (1944), page 156), i.e., a metal of atomic number 22–29, 40–47 or 72–79, inclusive. $m$, the number of cyclopentadienyl radicals present, is either 1 or 0. When $m$ is 1, $n$, the number of dithiolato radicals present, is also 1. When $m$ is 0 and M is one of the metals V, Cr, Mn, Fe, Co, Nb, Mo, Tc, Ru, Rh, Ta, W, Re, Os and Ir (metals of periodic Groups V–B, VI–B, and VII–B and most of VIII), $n$ is 3. When $m$ is 0 and M is one of the metals Ti, Ni, Cu, Zr, Pd, Ag, Hf, Pt and Au (metals of periodic Groups I–B and IV–B and the rest of those of VIII), $n$ is 2.

These chelates are prepared by the reaction of a metal, preferably in finely divided form, a metal carbonyl or a cyclopentadienyl metal carbonyl with bis(trifluoromethyl)-1,2-dithiete (U.S. Pat 3,052,691) as indicated in the equation:

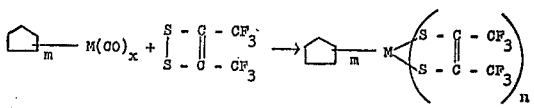

where $x$ is 0–6 and M, $m$ and $n$ are as defined above.

As illustrated in Example IX, no special reaction conditions or added materials of any sort are required to carry out this process. It suffices to bring the reactants into intimate contact to permit the reaction to take place. Intimate contact is readily attained since bis(trifluoromethyl)-1,2-dithiete is a liquid at ordinary temperatures. The reaction may be carried out over a wide range of temperatures, i.e., from −30° C. to 250° C., temperatures in the range from 0 to 150° C. being particularly preferred.

Pressure is not a critical factor in this process, pressures both above and below atmospheric pressure being operable. Atmospheric pressure is preferred for convenience.

It is convenient, though not essential, to conduct the reaction of this invention in the presence of a liquid diluent such as a hydrocarbon which is inert to the reactants and products. Suitable diluents include hexane, octane, dodecane, petroleum ether, cyclohexane, methyl cyclohexane, benzene, toluene, xylene, and the like.

The molar proportions in which the reactants may be brought together to carry out the process of this invention may be varied within wide limits. Molar ratios of metal carbonyl, cyclopentadienyl metal carbonyl or metal to bis(trifluoromethyl)dithiete in the range from 19:1 to 1:19 are operable. However, no excess of any reactant is essential, and it is preferred to employ the reactants in approximately the molar ratio in which the respective components appear in the product. When metal carbonyl reactants are employed, i.e. in compounds of Formula II in which $x$ is 1 or more, it is somewhat preferable that the molar proportion of compound II be equal to or less than the molar proportion of compund III.

A preferred group of the compounds of this invention are those of Formula I in which $m$ is 0, and in which $n$ is 2 when M is nickel or copper or $n$ is 3 when M is a metal as defined other than nickel or copper.

EMBODIMENTS OF THE INVENTION

In the following examples, parts are by weight unless otherwise indicated. Example VII represents a preferred embodiment.

Example I

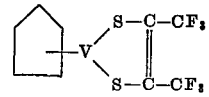

A mixture of 12 parts of cyclopentadienylvanadium tetracarbonyl and about 16 parts of bis(trifluoromethyl)-1,2-dithiete in 385 parts of methylcyclohexane is heated at reflux under an atmosphere of nitrogen for 3 hours, the mixture turning dark brown. The reaction mixture is cooled to room temperature and then to −78° C. At this temperature a black precipitate is separated by filtration. It is purified by sublimation at 160° C./0.25 mm. for 16 hours. The solid sublimate is black but appears dark olive green when powdered. The sublimate is again sublimed at 160° C./0.25 mm. to obtain 4.4 parts of cyclopentadienyl[1,2 - bis(trifluoromethyl)ethene - 1,2 - dithiolato] vanadium in the form of olive green crystals. The infrared absorption spectrum shows bands at 1245, 1175, 1140, 1020, 893, 823, 717 and 688 cm.⁻¹.

Example II

The procedure of Example I is repeated with the exception that the reflux heating step is continued for 16 hours and a single sublimation at 160° C./0.25 mm. is used for purification. There is obtained 9 parts of cyclopentadienyl[1,2-bis(trifluoromethyl)ethene - 1,2 - dithiolato]vanadium in the form of green crystals.

Analysis.—Calcd. for C₉H₅F₆S₂V: C, 31.6; H, 1.5; F, 33.3; S, 18.7; V, 14.9. Found: C, 31.8, 31.6; H, 1.7, 1.7; F, 34.3, 34.3; S, 18.9, 18.7; V, 16.3, 15.1.

Example III

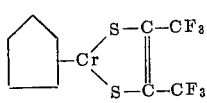

The procedure of Example II is repeated with the exception that mercuric cyclopentadienylchromium tricarbonyl, [C₅H₅Cr(CO)₃]₂Hg, is used in place of cyclopentadienylvanadium tetracarbonyl. A 38% yield of cyclopentadienyl[1,2 - bis(trifluoromethyl)ethene-1,2-dithiolato]chromium is obtained in the form of purple crystals.

*Analysis.*—Calcd. for C₉H₅F₆S₂Cr: C, 31.5; H, 1.5; F, 33.2; S, 18.7; Cr, 15.1. Found: C, 31.7, 32.0; H, 1.7, 2.0; F, 33.6; S, 19.3; Cr, 14.9.

Example IV

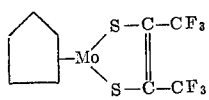

The procedure of Example II is repeated with the exception that cyclopentadienylmolybdenum tricarbonyl (dimer) is used in place of cyclopentadienylvanadium tetracarbonyl and the sublimation step is carried out at 170° C./1 mm. A 48% yield of cyclopentadienyl[1,2-bis(trifluoromethyl)ethene-1,2-dithiolato]molybdenum is obtained in the form of brown crystals.

*Analysis.*—Calcd. for C₉H₅F₆S₃Mo: C, 27.9; H, 1.3; F, 29.5; S, 16.5; Mo, 24.8. Found: C, 28.1; H, 1.7; F, 29.7; S, 16.8; Mo, 25.6.

Example V

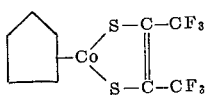

A mixture of 140 parts of cyclopentadienylcobalt dicarbonyl and 80 parts of bis(trifluoromethyl)-1,2-dithiete in 3850 parts of methylcyclohexane is heated at reflux and stirred under a blanket of nitrogen in the manner of Example I. The reaction mixture turns dark purple. It is cooled to room temperature and then to −78° C. for several hours. The black crystals which form are separated by filtration and recrystallized from dichloromethane/hexane to obtain 93 parts of cyclopentadienyl [1,2 - bis(trifluoromethyl)ethene-1,2-dithiolato]cobalt in the form of dark violet crystals melting at 150° C.

*Analysis.*—Calcd. for C₉H₅F₆S₂Co: C, 30.9; H, 1.4; F, 32.6; S, 18.3; Co, 16.8. Found: C, 31.5; H, 1.5; F, 32.4; S, 18.4; Co, 16.6.

Example VI

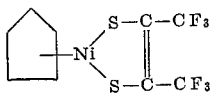

A mixture of 15 parts of cyclopentadienylnickel carbonyl (dimer) and 16 parts of bis(trifluoromethyl)-1,2-dithiete in 330 parts of hexane is stirred under nitrogen for 16 hours at room temperature. The reaction mixture turns dark green and a black solid starts to separate. The mixture is cooled to −78° C. and the black crystals are separated by filtration. They are recrystallized from dichloromethane/hexane to obtain 12 parts of cyclopentadienyl[1,2 - bis(trifluoromethyl)ethene - 1,2 - dithiolato] nickel in the form of dark green crystals.

*Analysis.*—Calcd. for C₉H₅F₆S₂Ni: C, 30.9; H, 1.4; F, 32.6; S, 18.3; Ni, 16.8. Found: C, 31.1; H, 1.8; F, 31.4; S, 18.7; Na, 16.8.

Example VII

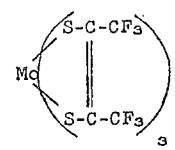

A mixture of 240 parts of molybdenum hexacarbonyl and 320 parts of bis(trifluoromethyl)dithiete in 3850 parts of methylcyclohexane is heated at reflux and stirred under a blanket of nitrogen for 18 hours. The reaction mixture turns black. It is then cooled to −78° C. for 36 hours. The black crystals which form are separated by filtration and purified by sublimation at 185–190° C./ 0.2 mm. to obtain 196 parts of tris[1,2-bis(trifluoromethyl)ethene - 1,2 - dithiolato]molybdenum in the form of glistening purple crystals.

*Analysis.*—Calcd. for C₁₂F₁₈S₆Mo: C, 18.6; F, 44.2; S, 24.8; Mo, 12.4. Found: C, 18.8; F, 43.5; S, 24.9; Mo, 12.9.

Example VIII

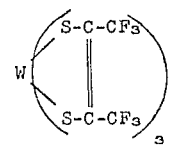

The procedure of Example VII is repeated with the exception that tungsten hexacarbonyl is used in place of molybdenum hexacarbonyl. Tris[1,2-bis(trifluoromethyl) ethene-1,2-dithiolato]tungsten is obtained in the form of purple crystals.

Example IX

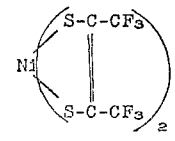

Turnings of nickel metal are covered with bis(trifluoromethyl)dithiete and allowed to stand at 25° C. After one hour the reaction mixture is violet in color and after four hours dark crystals have formed. The crystals are separated and dried. They are identified as bis[1,2 - bis(trifluoromethyl)ethene - 1,2-dithiolato]nickel by a melting point of 135° C. and by elemental analysis.

Example X

Bis(trifluoromethyl)dithiete (63 parts) is dissolved in 44 parts of benzene. To this solution is added 24 parts of nickel carbonyl and the reaction mixture is allowed to stand several minutes at room temperature. The reaction mixture is then filtered to separate 35 parts of bis[1,2-bis (trifluoromethyl)ethene-1,2-dithiolato]nickel in the form of violet-black crystals melting at 135° C. and boiling at 240° C. An additional 20 parts of this product is recovered by evaporating benzene from the above filtrate in a stream of nitrogen.

*Analysis.*—Calcd. for C₈F₁₂S₄Ni: C, 18.79; F, 44.60; S, 25.05; Ni, 11.54. Found: C, 18.83; F, 44.54; S, 24.73; Ni, 11.41.

Example XI

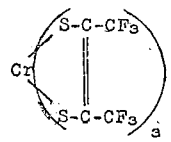

A mixture of 340 parts of bis(trifluoromethyl)dithiete, 107 parts of chromium hexacarbonyl and 1368 parts of heptane is heated at reflux under nitrogen for 4 days.

The reaction mixture is cooled and the green crystalline solid which separates (250 parts) is heated at 90° C./1 mm. for 24 hours to remove by sublimation unreacted chromium hexacarbonyl. The residue is recrystallized from methylcyclohexane to give dark green crystals of tris[1,2 - bis(trifluoromethyl)ethene - 1,2 - dithiolato] chromium.

*Analysis.*—Calcd. for $C_{12}F_{18}S_6Cr$: C, 19.73; H, 0.00; S, 26.34. Found: C, 20.40; H, 0.32; S, 26.28.

When the metal carbonyls shown in Table I are substituted for $Mo(CO)_6$ in the procedure of Example VII, reaction with bis(trifluoromethyl)dithiete yields the indicated metal chelate.

TABLE I

| Metal Carbonyl Starting Material | Metal Chelate Formed |
|---|---|
| $Fe(CO)_5$ | $Fe(S-C-CF_3 \mid\mid S-C-CF_3)_3$ |
| $Co_2(CO)_8$ | $Co(S-C-CF_3 \mid\mid S-C-CF_3)_3$ |
| $Ru(CO)_5$ | $Ru(S-C-CF_3 \mid\mid S-C-CF_3)_3$ |
| $[Rh(CO)_4]_2$ | $Rh(S-C-CF_3 \mid\mid S-C-CF_3)_3$ |
| $[Re(CO)_5]_2$ | $Re(S-C-CF_3 \mid\mid S-C-CF_3)_3$ |
| $Os(CO)_5$ | $Os(S-C-CF_3 \mid\mid S-C-CF_3)_3$ |
| $Ir(CO)_3$ | $Ir(S-C-CF_3 \mid\mid S-C-CF_3)_3$ |
| $Tc_2(CO)_{10}$ | $Tc(S-C-CF_3 \mid\mid S-C-CF_3)_3$ |

When manganese, vanadium, niobium and tantalum metals in finely divided form are in turn substituted for nickel in the procedure of Example IX, there are obtained respectively tris[1,2 - bis(trifluoromethyl)ethene-1,2 - dithiolato]manganese, tris[1,2 - bis(trifluoromethyl)ethene - 1,2 - dithiolato]vanadium, tris[1,2 - bis(trifluoromethyl)ethene - 1,2 - dithiolato]niobium and tris[1,2-bis(trifluoromethyl)ethene-1,2 - dithiolato]tantalum.

When titanium, zirconium, hafnium, palladium, platinum, copper, silver and gold metals in finely divided form are in turn substituted for nickel in the procedure of Example IX, there are obtained respectively bis[1,2-bis(trifluoromethyl)ethene - 1,2 - dithiolato]titanium, bis [1,2 - bis(trifluoromethyl)ethene - 1,2 - dithiolato]zirconium, bis[1,2 - bis(trifluoromethyl)ethene - 1,2 - dithiolato]hafnium, bis[1,2 - bis(trifluoromethyl)ethene-1, 2 - dithiolato]palladium, bis[1,2 - bis(trifluoromethyl) ethene - 1,2 - dithiolato]platinum, bis[1,2 - bis(trifluoromethyl)ethene - 1,2 - dithiolato]copper, bis[1,2 - bis(trifluoromethyl)ethene - 1,2 - dithiolato]silver and bis[1,2-bis(trifluoromethyl)ethene - 1,2 - dithiolato]gold. The yields of these chelate products are increased if the reactions are carried out at 120° C. in the presence of an activator such as iodine or carbon monoxide.

The [1,2 - bis(trifluoromethyl)ethene - 1,2 - dithiolato] metal chelates and the cyclopentadienyl[1,2-bis(trifluoromethyl)ethene-1,2-dithiolato]metal chelates of this invention are all soluble, at least to some extent, in gasoline and are useful as gasoline additives which impart antiknock properties to the gasoline. These compounds in finely powdered form are also useful in criminal investigations since they react selectively with the imprinted area of fingerprints, turning the imprinted area very dark in color and thereby developing the fingerprint. The neutral chelates of this invention are powerful oxidizers, in that they are readily reduced to ionic forms. They are thus useful as oxidizing agents, for example, in the preparation of ferric salts from ferrous salts.

*Example XII*

A fingerprint mark is made on a plain piece of paper. Powdered bis[1,2 - bis(trifluoromethyl)ethene - 1,2 - dithiolato]nickel is dusted on the paper and then shaken off. The dark nickel chelate adheres to the fingerprint and renders it visible, suitable for photographing.

*Example XIII*

Fingers are pressed to a piece of paper and also to a metal surface. Powdered tris[1,2 - bis(trifluoromethyl) ethene-1,2-dithiolato]chromium is dusted over the areas and brushed off lightly. The powder remains on the fingerprints making them plainly visible. Similarly, a fingerprint on glass is developed by dusting the glass with powdered tris[1,2 - bis(trifluoromethyl)ethene - 1,2 - dithiolato]molybdenum.

Since obvious modifications and equivalents in the invention will be evident to those skilled in the chemical arts, I propose to be bound solely by the appended claims.

The embodiments of the invention in which an exclusive property or privilege is claimed are defined as follows.

I claim:
1. Compounds of the formula

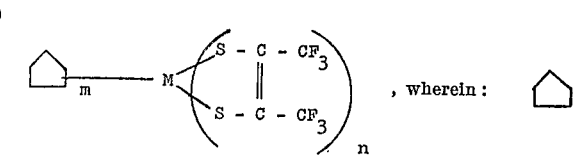, wherein:

⬠ is the cyclopentadienyl radical;
M is a metal of one of the atomic numbers 22–29, 40–47 and 72–79, all inclusive;
m is a number from 0 to 1; and
n is a number from 1 to 3, being 1 when m is 1; being 2 when m is 0 and M is selected from the group consisting of Ti, Ni, Cu, Zr, Pd, Ag, Hf, Pt and Au; and being 3 when m is 0 and M is selected from the group consisting of V, Cr, Mn, Fe, Co, Nb, Mo, Tc, Ru, Rh, Ta, W, Re, Os and Ir.

2. Cyclopentadienyl[1,2-bis(trifluoromethyl)ethene-1,2-dithiolato]vanadium.

3. Cyclopentadienyl[1,2-bis(trifluoromethyl)ethene-1,2-dithiolato]chromium.

4. Cyclopentadienyl[1,2-bis(trifluoromethyl)ethene-1,2-dithiolato]molybdenum.

5. Cyclopentadienyl[1,2-bis(trifluoromethyl)ethene-1,2-dithiolato]cobalt.

6. Cyclopentadienyl[1,2-bis(trifluoromethyl)ethene-1,2-dithiolato]nickel.

7. Tris[1,2 - bis(trifluoromethyl)ethene-1,2-dithiolato]molybdenum.

8. Tris[1,2 - bis(trifluoromethyl)ethene-1,2-dithiolato]tungsten.

9. Bis[1,2 - bis(trifluoromethyl)ethene - 1,2-dithiolato]nickel.

10. Tris[1,2 - bis(trifluoromethyl)ethene - 1,2 - dithiolato]chromium.

11. The process of preparing a compound of claim 1 which comprises reacting bis(trifluoromethyl)-1,2-dithiete with a member of the group consisting of:
   a metal of one of the atomic numbers 22-29, 40-47 and 72-79, all inclusive;
   a cyclopentadienyl carbonyl compound of one of said metals; and
   a carbonyl of one of said metals.

12. The process of preparing the compound of claim 2 which comprises reacting bis(trifluoromethyl)-1,2-dithiete with cyclopentadienylvanadium tetracarbonyl.

13. The process which comprises reacting bis(trifluoromethyl)-1,2-dithiete with mercuric cyclopentadienylchromium tricarbonyl.

14. The process of preparing the compound of claim 4 which comprises reacting bis(trifluoromethyl)-1,2-dithiete with cyclopentadienylmolybdenum tricarbonyl.

15. The process of preparing the compound of claim 5 which comprises reacting bis(trifluoromethyl)-1,2-dithiete with cyclopentadienylcobalt dicarbonyl.

16. The process of preparing the compound of claim 6 which comprises reacting bis(trifluoromethyl)-1,2-dithiete with cyclopentadienylnickel carbonyl.

17. The process of preparing the compound of claim 7 which comprises reacting bis(trifluoromethyl)-1,2-dithiete with molybdenum hexacarbonyl.

18. The process of preparing the compound of claim 8 which comprises reacting bis(trifluoromethyl)-1,2-dithiete with tungsten hexacarbonyl.

19. The process of preparing the compound of claim 9 which comprises reacting bis(trifluoromethyl)-1,2-dithiete with metallic nickel.

20. The process of preparing the compound of claim 9 which comprises reacting bis(trifluoromethyl)-1,2-dithiete with nickel carbonyl.

References Cited

UNITED STATES PATENTS 3,097,225   7/1963   Dubeck _____ 260—439

OTHER REFERENCES

Bahr et al.: Chem. Ber., 90, pages 438-443 (1957).
Bahr: Ang. Chem., 70, pages 606-7 (1958).
Krespan et al.: J. Am. Chem. Soc., 83, pages 3438-3440 (1961).
Simmons et al.: J. Am. Chem. Soc., 84, pages 4782-4785 (1962).

TOBIAS E. LEVOW, *Primary Examiner.*

A. P. DEMERS. *Assistant Examiner.*